July 2, 1968     J. J. YUCUS     3,390,818
LOCATION OF DRAIN FOR VAT
Filed Jan. 12, 1967
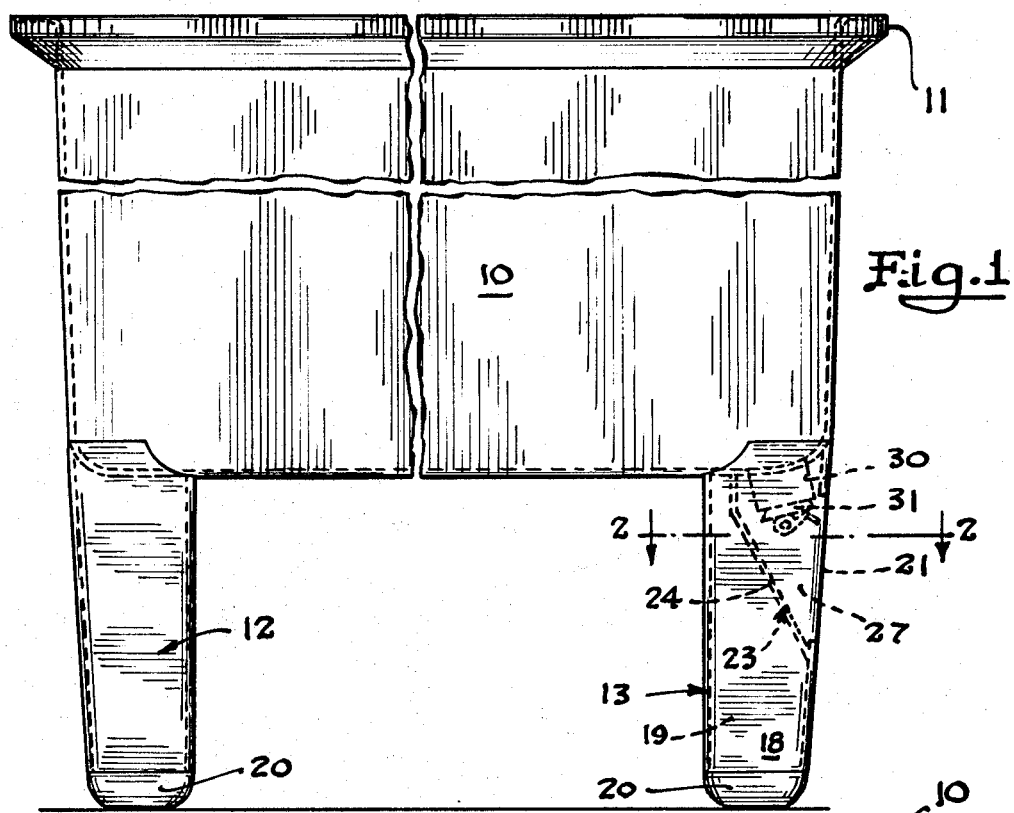
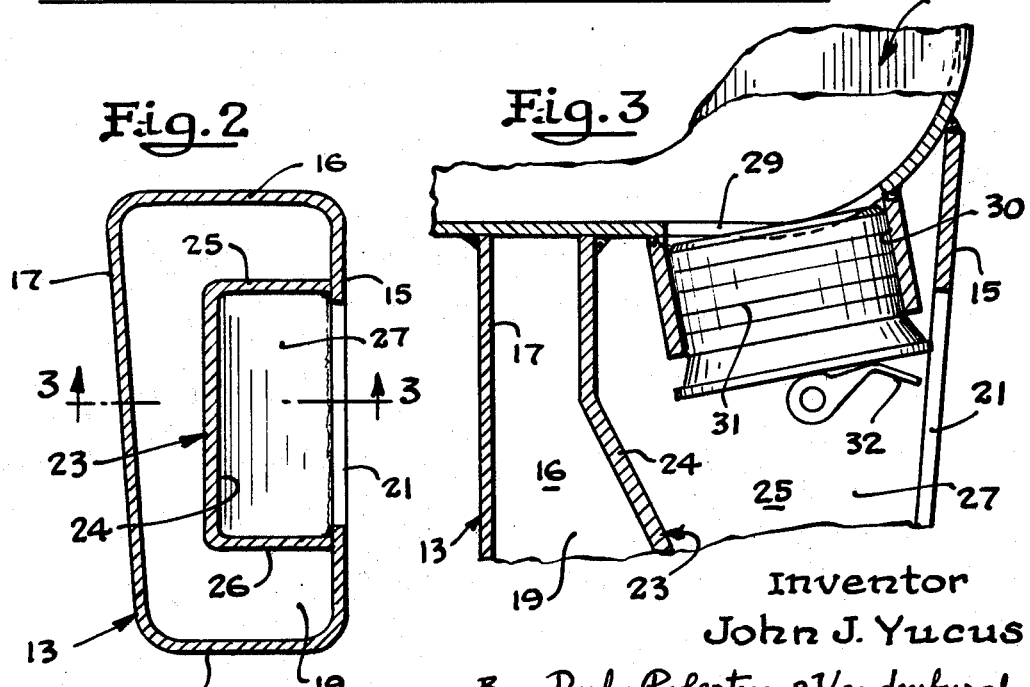
Inventor
John J. Yucus
By Darbo, Robertson & Vandenburgh
Attorneys

United States Patent Office 3,390,818
Patented July 2, 1968

3,390,818
LOCATION OF DRAIN FOR VAT
John J. Yucus, Chicago, Ill., assignor to St. John & Co., Chicago, Ill., a corporation of Illinois
Filed Jan. 12, 1967, Ser. No. 608,803
3 Claims. (Cl. 222—185)

ABSTRACT OF THE DISCLOSURE

In a vat for use in abattoirs or the like, wherein the vat is often moved from place to place with a fork lift truck, and the vat is adapted to nest with others of like configuration for storage purposes, the vat is provided with four legs, one of which is in the form of a hollow metal shell. This one leg has an access opening at one exterior side thereof. The drain fittings for the vat are wholly within the confines of this one leg, and are accessible through said access opening. A deflector extends from the bottom of the vat to the bottom of the access opening so as to cause the discharge from the vat to exit through said access opening. This deflector also strengthens the one leg so as to additionally protect the drain fittings.

Background of the invention

Abattoirs and food processing plants often use a number of large vats for holding various products, such as offal, portions of carcasses, sausage emulsion or components thereof, etc. Such vats are usually portable so that they can be moved from place to place, as required. While many such vats have their own wheels or casters for portability, many others are on fixed legs. These latter often are moved by slipping the tines of a fork lift truck under the vat and picking the vat up by the support of the tines for transportation. Usually such vats will have drain openings therein to facilitate their being cleaned between periods of use. The vats are normally formed so that they can be nested and stacked to conserve storage space when they are not in use, or for shipping purposes. It is not uncommon to have the drain fittings on the bottom of the tank damaged by the tines of a fork lift truck when they are handled. Even though the fittings may be positioned so that they would not normally be contacted by the tines of the fork lift truck, a careless machine operator can succeed in causing such damage. The principal object of the present invention is to provide a readily accessible drain fitting for such a vat, and at the same time protect the fittings so that they will not be damaged when the vats are stacked, handled with a fork lift truck, etc.

Summary of the invention

The present invention relates to a vat having the drain fittings within a hollow leg, at which point the fittings are protected yet easily accessible.

Brief description of the drawings

FIGURE 1 illustrates an elevational view of a vat embodying the present invention;

FIGURE 2 is a horizontal section as viewed at line 2—2 of FIGURE 1; and

FIGURE 3 is a partial section as viewed at line 3—3 of FIGURE 2.

Description of the preferred embodiment

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The vat of the illustrated embodiment includes a tank, generally 10, having an upper rim 11. The tank is rectangular with legs at the four corners thereof. Only two of the legs, 12 and 13, appear in FIGURE 1. These legs are spaced far enough apart so that the tines of a fork lift truck may be received therebetween. The overall configuration of the vat (tank and legs) is one of tapering inwardly from top to bottom so that a plurality of such vats may be stacked in nested form.

Leg 13 is formed by four wall members 15, 16, 17 and 18, which define a hollow interior 19. A base or foot 20 connects the wall members and closes the bottom of space 13. The wall members 15–18 are welded to tank 10. In the illustrated embodiment the foot 20 is formed as a separate unit and likewise welded to the wall members. Wall member 15 defines an access opening 21.

Within the hollow interior 19 is a deflector member generally 23 having a rear wall 24, and two side walls 25 and 26. Deflector member 23 is welded to leg 13 where it contacts the same and is likewise welded to tank 10 where contact is made. It defines an enclosed space 27, which communicates with access opening 21.

Within space 27 there is a drain opening 29 in the bottom of tank 10. Surrounding this opening and welded to the bottom of the tank is a cylindrical hollow ring 30 forming a fixed drain fitting part. A drain plug 31 is received within ring 30 and is frictionally engaged therein to hold it in place. This plug is of rubber, or the like, and is expandable and contractible by the movement of an actuating lever 32. When contracted it can easily be moved into and out of ring 30, and when expanded it is frictionally engaged therein to serve as a closure for the drain opening. Such plugs are conventional items of commerce, as for example, that sold under the trademark Snap-Tite.

It will be seen that the closure 31 and ring 30 are wholly within the confines of leg 13, where they are protected from damage. Yet the plug is easily accessible through opening 21. When the plug is removed, material from tank 10 can drain out opening 21, the material being directed out of opening 21 by reason of the deflector member 23 and the wall member 15 enclosing space 27 except through opening 21. The deflector member 23 additionally strengthens leg 13 to further protect the drain fittings.

The vat may be formed of metal components suitable for its use. For example, tank 10 can be 13 gauge stainless steel No. 304 with the legs of 10 gauge stainless steel. Ring 30 can be a ¾ inch length of 1½ inch stainless steel pipe. With this size ring a No. 50 Snap-Tite rubber plug is particularly suitable. Rim 11 has a ½ inch by 1 inch flat bar reinforcing within the enclosed confines of the rim.

I claim:

1. In a rectangular metal open top vat for use in an abattoir or the like and adapted to be moved by a fork lift truck and to nest with other like vats, said vat including a tank supported on four legs, said four legs being at the four corners of the tank and being spaced to receive the tines of the lift truck therebetween, said legs being within the rectangle defined by the inside top of the tank so that they will be received within the interior of a like vat for nesting; the improvement comprising: one of said legs comprising wall members defining a hollow metal shell with an open interior, said one leg having an access opening in one exterior wall member thereof, said tank having means defining a drain opening in the bottom thereof communicating with the interior of said one leg, and a removable closure device received in said means, said means and closure device being completely within the periphery of said one leg whereby they are protected against being accidentally struck and damaged as said vat is stacked with others or handled by said truck.

2. In a vat as set forth in claim 1, including a deflector member within said one leg, at least one of said members surrounding said means adjacent the top of said members and defining an enclosed space communicating with said access opening, said deflector member having a rear wall tapering downwardly towards said one wall member and meeting said one wall member adjacent the bottom of said access opening.

3. In a vat as set forth in claim 2, wherein said means includes a cylindrical hollow ring affixed to the bottom of the tank with the interior thereof in communication with the interior of the tank, and said device comprising a lever actuated plug of rubber or the like fitting securely in said ring and reducible in size by the actuation of said lever for release and removal from said ring.

References Cited
UNITED STATES PATENTS

| | | | |
|---|---|---|---|
| 1,952,568 | 3/1934 | Schapp et al. | 108—24 X |
| 2,657,830 | 11/1953 | Briggs | 68—208 X |

STANLEY H. TOLLBERG, *Primary Examiner.*